United States Patent [19]

Schlein

[11] 3,733,681
[45] May 22, 1973

[54] METHOD OF FORMING GRIPPING DEVICE

[75] Inventor: Seymour N. Schlein, University Heights, Ohio

[73] Assignee: The Fanner Manufacturing Company, Cleveland, Ohio

[22] Filed: Aug. 17, 1970

[21] Appl. No.: 64,617

Related U.S. Application Data

[62] Division of Ser. No. 729,610, May 16, 1968, Pat. No. 3,561,071.

[52] U.S. Cl. .................... 29/447, 29/517, 29/523
[51] Int. Cl. ............................................. B23p 11/02
[58] Field of Search ................... 29/447, 461, 517, 29/523; 24/123 C, 123 W, 122.6, 123.5; 248/63

[56] References Cited

UNITED STATES PATENTS

| 3,376,060 | 4/1968 | Tomioka | 29/517 UX |
| 3,551,999 | 1/1971 | Gutmann | 29/517 |
| 3,590,474 | 7/1971 | Beghi | 29/517 X |
| 1,735,563 | 11/1929 | Deckard | 29/447 |
| 2,294,091 | 8/1942 | Mahr | 29/461 |
| 2,664,609 | 1/1954 | Kellems | 24/123.5 |
| 3,007,243 | 11/1961 | Peterson | 29/461 X |
| 3,334,663 | 8/1967 | Peterson | 24/123 C X |

FOREIGN PATENTS OR APPLICATIONS

| 1,044,465 | 9/1966 | Great Britain | 24/123 W |

Primary Examiner—Charlie T. Moon
Attorney—William N. Hogg

[57] ABSTRACT

A device, and method of making the same, for gripping a linear body wherein a plurality a helical preformed resilient elements are secured in a socket member between a sleeve and a core by swaging or other mechanical action. The preformed elements project from the socket and are disposed to wrappingly engage a line.

7 Claims, 16 Drawing Figures

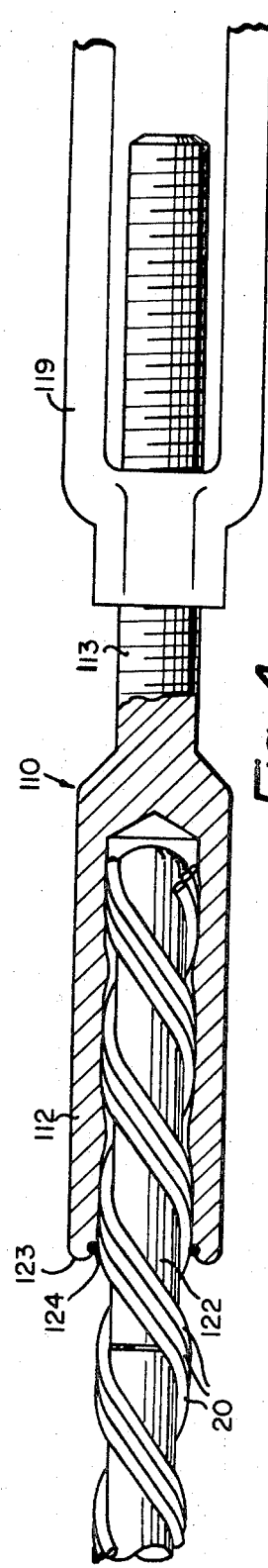
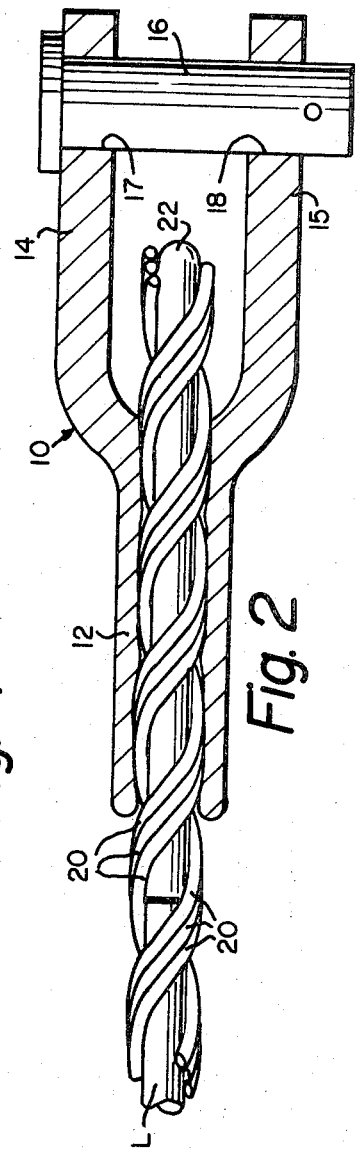
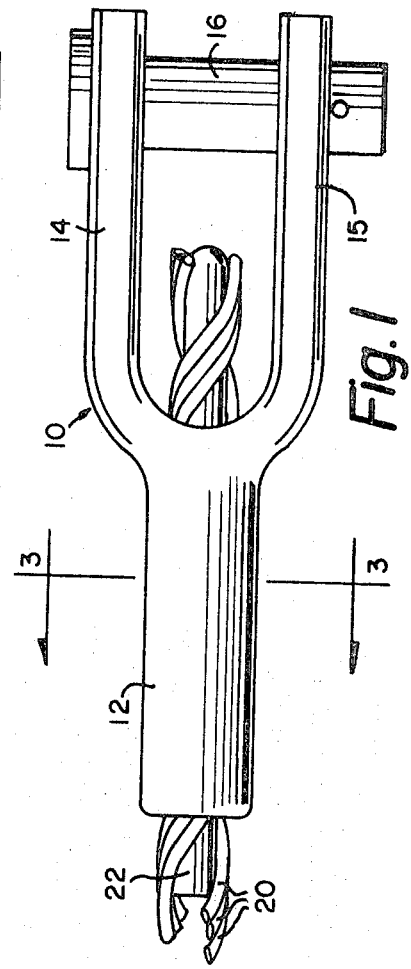
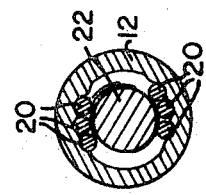
Fig. 1
Fig. 2
Fig. 3
Fig. 4

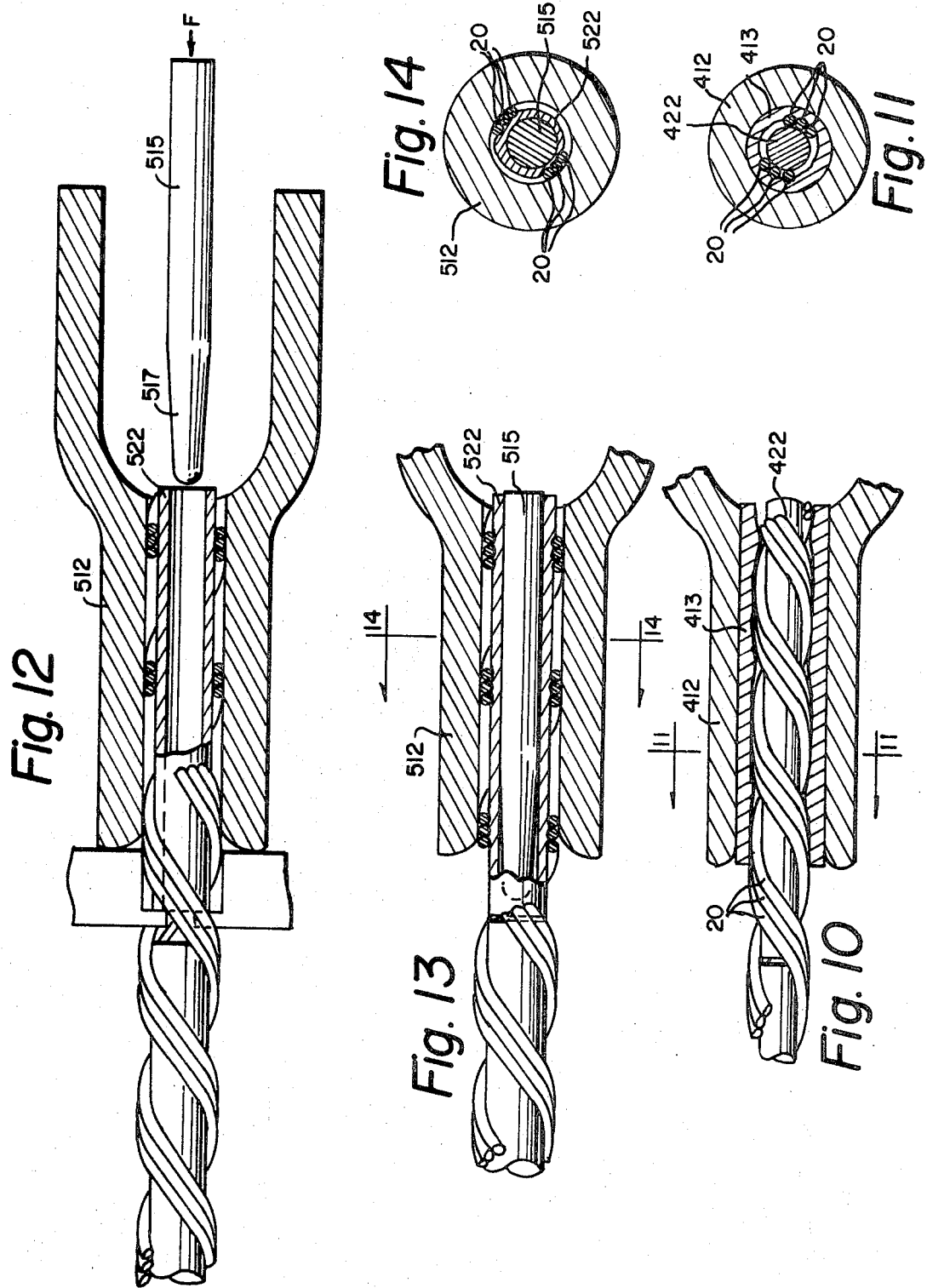

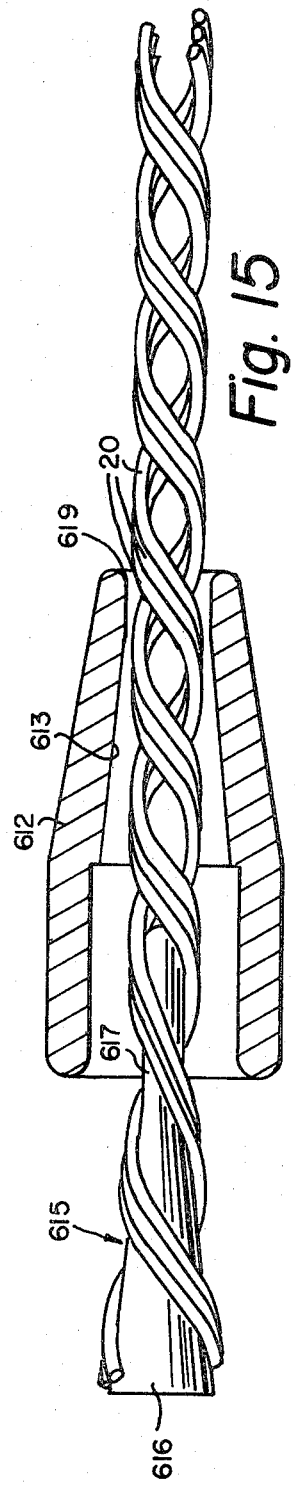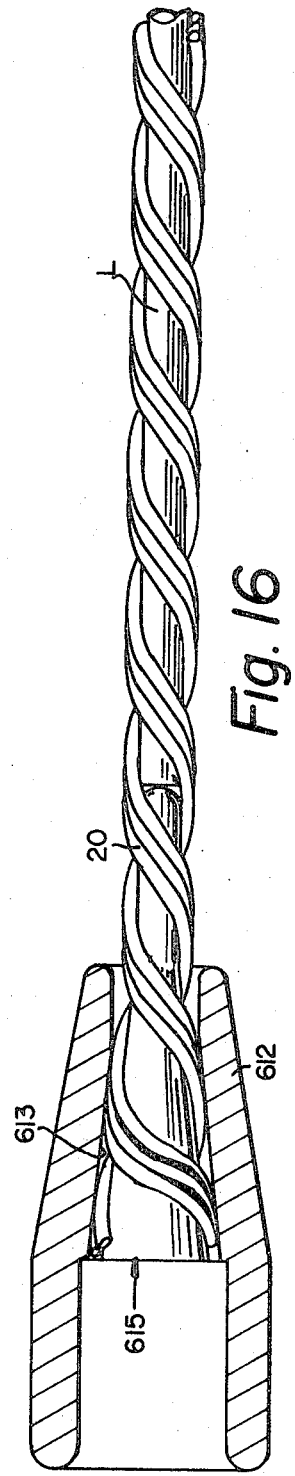

3,733,681

METHOD OF FORMING GRIPPING DEVICE

This application is a division of application Ser. No. 729,610 filed May 16, 1968, for Gripping Member now U.S. Pat. No. 3,561,071.

This invention relates to gripping devices, and more particularly to fittings employing helically preformed resilient elements and a method of making such fittings. In even more particular aspects, this invention relates to fittings and their method of manufacture wherein a plurality of helically preformed elements are held in a socket between a sleeve member and a core member by mechanical action, such as a wedging or by swaging, and which helically preformed elements extend from the socket and are adapted to grippingly engage the end of a line. This invention also contemplates the provision of an improved support engaging device for fittings and more particularly to a self-locking type bail device for fittings.

There have been many prior art devices for gripping of linear bodies. Several of these devices have utilized sets of helically preformed rods bent in the form of a hairpin and comprising a bight to engage the support and a pair of helically formed legs for wrappingly engaging and gripping the line to be dead ended. These devices or fittings have been quite successful for many applications. However, in some instances the attachment devices of the anchoring structure are not always ideally suited for the fittings. This often requires the use of extra hardware items, such as thimbles, bolts and plates, to adapt the attachment to the fittings. Also with respect to larger sizes of the fittings threading of the fitting through an otherwise compatible attachment is sometime difficult.

One of the outstanding advantages of the present invention is that a fitting can be provided which is compatible with many different types of attachment devices of anchoring structures.

Another feature of the present invention is the provision of a support engaging member on a line gripping device which support engaging member is frictionally secured to the socket member by a cap which is self-tightening under pressure.

These and other advantages will become apparent together with a fuller understanding of the invention by reference to the following description and accompanying drawings in which:

FIG. 1 is a side elevational view of one embodiment of a swaged line gripping device according to this invention;

FIG. 2 is a longitudinal sectional view of the device of FIG. 1;

FIG. 3 is a sectional view taken on line 3—3 of FIG. 1;

FIG. 4 is a longitudinal sectional view of another embodiment of a line gripping device according to this invention;

FIG. 10 is a longitudinal sectional view of a device showing the use of a separate sleeve member for metal flow;

FIG. 11 is a sectional view taken substantially along the plane 11—11 of FIG. 10;

FIGS. 12 and 13 are side elevational views partially in section representing a method of expanding a hollow core member to provide the material flow for securing the helically preformed devices;

FIG. 14 is a sectional view taken substantially along the plane 14—14 of FIG. 13; and FIGS. 15 and 16 are side elevational views, partially in section, showing the formation of a gripping device wherein the rods are held by wedging action.

Figure 7:
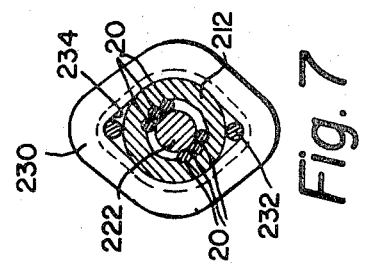
FIG. 7 is a sectional view taken substantially along the plane of line 7—7 of FIG. 6.

Briefly, the present invention contemplates a line gripping device wherein a plurality of preformed helical elements are mechanically secured between a sleeve member and a core member to provide a socketed fitting. The helically preformed elements and socket in which the elements are secured will withstand a pulling force thereon exerted by a line gripped by the helically preformed elements. The invention also contemplates the provision of a support engaging device which will be self-tightening under pressure of a gripped line.

Referring now to the drawings and for the present to FIGS. 1 through 3, one embodiment of a swaged socketed dead end fitting according to this invention is shown. In this embodiment, a clevis member 10 is provided which has a hollow sleeve portion 12 and a pair of arms 14 and 15 defining a bifurcated end. A clevis pin 16 is provided to pass through apertures 17 and 18 formed in arms 14 and 15 for securing the clevis member to a support.

A plurality of resilient elements 20 are provided which are helically preformed to substantially conform to each other with respect to pitch length and hand of lay. The resilient elements 20 are assembled in a set around a core 22 and then inserted within the sleeve portion 12 of the clevis member 10. When the core 22 with the resilient elements 20 wrapped therearound is inserted in this telescoping relationship with the sleeve, the sleeve portion 12 is mechanically worked, preferable by swaging, to cause a metal flow to secure the resilient elements 20 between the sleeve 12 and the core 22. This provides a socketed gripping device wherein a portion of resilient elements 20 are firmly gripped in the socket and the remaining portion of the elements project therefrom. The elements have a common central axis and are disposed to wrappingly engage a line L as shown in FIG. 2.

The core 22 serves several functions in this device. First, it provides a support for the helically preformed elements during the swaging operation to permit the flow of material. The core also serves the function of allowing the resilient elements to be assembled and arranged in a proper fashion and inserted within the sleeve so that the elements are properly arranged to perform the gripping function.

As shown in FIGS. 1 through 3, the core is longer in length than the sleeve 12 and extends beyond both the front end and the rear end of the sleeve portion 12. The extending portions serve to prevent the marking or nicking of the resilient elements 20 during the swaging operation which would occur if the core terminated at or close to the end of the sleeve 12. Nicking or scoring can materially weaken the helically preformed elements and contribute to an early failure thereof. By lengthening the core to permit it to extend beyond the ends of the sleeve member 12, sharp corners, which could cause nicks, are eliminated in the region around the sleeve where force is applied during swaging. Also the end of the sleeve 12 is chamfered as shown to reduce the chance of nicking.

The portion of the core extending forwardly (i.e., toward the portion of the elements which are to grip the line) provides a stop surface or abutment for the line to be gripped within the helically preformed elements.

Referring now to FIG. 4, a longitudinal sectional view of another type of swaged socket fitting is shown. In this embodiment a socket member 110 is provided having a hollow sleeve portion 112 at one end thereof and a threaded opposite end portion 113 extending therefrom. The threaded end portion 113 is adapted to threadably engage one end of a turnbuckle 119. The end of the sleeve member 112 is rounded or chamfered at 123, as in the previous embodiment. A plurality of helically preformed resilient elements 20, similar to those shown in FIGS. 1 through 3, are wrapped around a core 112 which has a configuration similar to the core shown in FIGS. 1 through 3. This core, with the elements 20 wrapped therearound, is inserted within the hollow sleeve portion 112. In this embodiment, a resilient O-ring 124 is provided which surrounds the elements 20 within the sleeve portion 112. This ring acts to further prevent nicking of the elements 20. Also, this ring will act, to some extent, as a moisture barrier. In this embodiment, as in the previous embodiment, the sleeve portion 112 is swaged or otherwise mechanically worked to cause a mechanical flow of material. This will secure the ends of elements 20 between the sleeve portion 112 and the core member 122 and they will extend therefrom for engagement with a line.

FIGS. 5 through 9 show two other embodiments of this invention incorporating the feature of detachable bails for securing the line to a support member.

Figure 5:
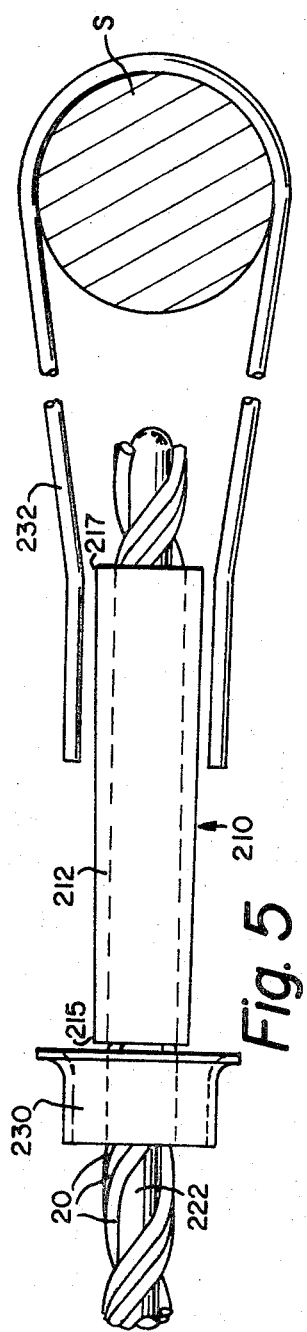
FIG. 5 is a side elevational view, partially in section of another embodiment of this invention showing a swaged line gripping device having the cap and bail which are ready to secure the fitting to a support member.
Figure 6:
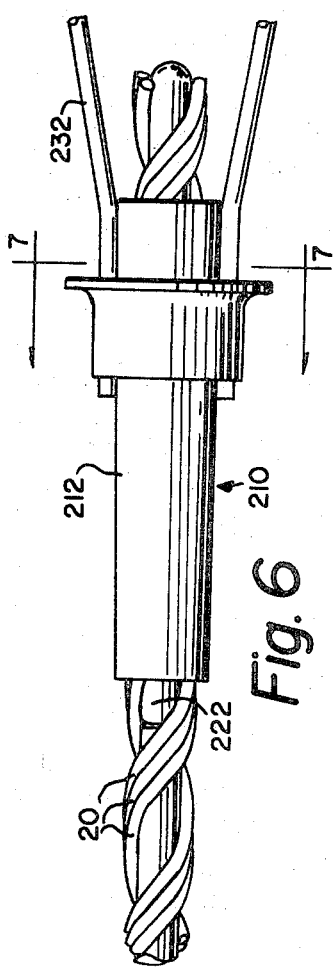
FIG. 6 is a side elevational view of the device of FIG. 5 assembled around the support member.

Referring now to FIGS. 5 through 7, one particular embodiment of this type device incorporating a detachable support securing means in the form of a bail and lock cap is shown. FIG. 5 shows the components of the device in a position ready for assembling to form a device which grips the end of a line. The device includes a socket member 210 which is comprised of a hollow sleeve member 212 which has been swaged over a plurality of helically preformed elements 20 wrapped around a core 222 and inserted within the sleeve member 212. After the socket has been formed a cap member 230 is provided which is slipped over the end of the helically preformed elements 20 and pushed up to near the end of the sleeve 212, as shown in FIG. 5.

Upon assembly the ends of the helically preformed elements 20 are wrapped around the end of the line as shown in FIG. 5 and a bail member 232 is wrapped around a support S to which the socket 210 is to be secured. As can be seen, the outside surface of the sleeve 212 tapers from a smaller diameter adjacent the front end 215 thereof to a large diameter at the back end 217 thereof. The legs of the bail 232 are placed adjacent to the tapering outer surface of the sleeve member 12 and the cap 230 is pushed up the sleeve until it engages the legs of the bail member 230. This position is shown in FIGS. 6 and 7.

As can be seen in FIG. 7, the cap member 230 has a central opening 234 which is generally oval in shape with the elongated portion of the oval being adapted to overlay the legs of the bail member 232. As the cap member 230 is pushed along the sleeve member 212 from the rear thereof, the diameter of the sleeve member 212 enlarges which causes the inside surface 234 of the cap 230 to frictionally engage the legs of the bail member 232. The farther the cap is pushed, the more force will be exerted against the legs of the bail member 232.

Thus, as can be seen in FIG. 6, when a tension force is applied to socket member 210, tending to pull it in a direction away from the support S, a force will urge the cap member farther along the sleeve 212 thus increasing the holding force exerted by the cap member 230 on the bail member. In the preferred embodiment, the internal opening 234 of cap member 230 also tapers from front end 231 to the rear end 233 which taper substantially corresponds to the taper of the sleeve 212. By having complimentary tapers in this manner, a gripping or holding force will be exerted along the entire length of the legs of the bail member 232 which are confined between the cap member 230 and the sleeve 212.

Figure 9:
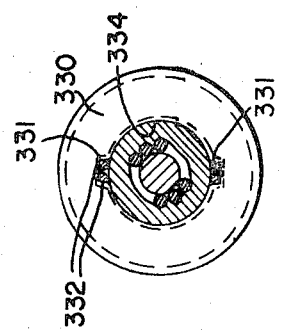
FIG. 9 is a sectional view taken substantially along the plane 9—9 of FIG. 8.
Figure 8:
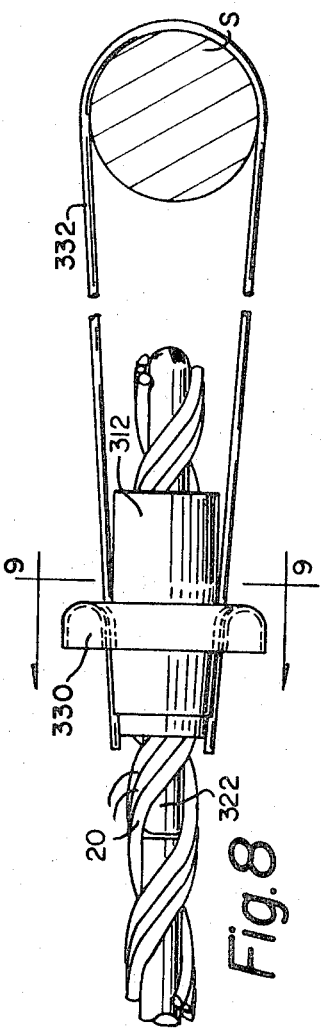
FIG. 8 is another embodiment of the device similar to that shown in FIG. 6 assembled on a support member.

Referring now to FIGS. 8 and 9, another embodiment of a socketed device is shown. In this embodiment a sleeve member 212 is provided which is generally barrel shaped, i.e., tapering from a center of a large diameter to both ends of a smaller diameter. The helically preformed members 20 are swaged over a core 322 within the sleeve 312 as in the previous embodiment. However, in this embodiment a cap member 330 has a central opening which is generally circular in cross-section with a pair of relieved or cut-out portions 331 on opposite sides thereof. The bail member 332 is comprised of a pair of bent wires which are adapted to be received within the cut-out portions 331 in the cap. The movement of the cap in 330 will lock the bail member 332 securely against the sleeve 312 in a similar manner as described in conjunction with FIGS. 5 through 7. Again in this embodiment, the internal opening 334 of the cap has a taper substantially complimentary to the taper of the outer surface of the sleeve 312 from the center to one end. The barrel shape of the sleeve 312 provides some relief for the bail i.e., it does not bear against the sleeve past the mid portion thereof, this shape also permits the helical elements to be inserted into either end.

In the manufacture of the devices as described above, a hollow sleeve portion has been provided which is directly swaged over the helically preformed elements 20 as they are assembled on a core. One of the requirements for the successful formation of a socket is that there be sufficient metal flow to securely bond the helically preformed elements and prevent them from pulling out. Thus, to obtain a good metal flow a relatively soft material, such as a mild steel is desirable. However, for certain applications it may be desirable to have a socket which is stronger than mild steel. FIGS. 10 and 11 show, somewhat diagrammatically, the use of a relatively tough alloy outer sleeve 412 into which is inserted a liner 413 of mild annealed steel or some other softer material. This ring 413 surrounds the ends of the helically preformed elements 20 which are wrapped around a core 422 as in the previous embodiments. When the outer sleeve 412 is swaged, the mechanical force pressing inwardly thereon causes the inner ring 413 to compress and metal flow thereof will take place bonding the helically formed elements 420 around the core 422. Since the ring 413 is of a softer and more malleable steel, this ring will be deformed to a greater extent than would a ring of alloy steel, thereby increasing the bonding or holding power. This flowing action is shown somewhat diagrammatically in FIG. 11. This same result can be achieved by selectively softening the inner portion of an otherwise harder sleeve member, such as by selective annealing or decarbonization.

Referring now to FIGS. 12 through 14, a method of providing a bonded socketed device is shown wherein the metal is caused to flow by mechanical force other than swaging. This embodiment allows a sleeve member of alloy steel of greater strength to be used while obtaining a good flow of material for a strong bonded socket. A hollow sleeve member 512 is provided. The helically preformed elements 20 are wrapped on a hollow core member 522. The core member 522 is made of a malleable material such as annealed mild steel. A plug member 515 is shown which is adapted to be inserted into the hollow core 522. FIG. 12 shows the plug in a position to be inserted.

The plug 515 has one end 517 which is rounded and tapered with a diameter slightly smaller than the internal diameter of the core 522. (This taper is exaggerated in the drawing for purpose of illustration). The remainder of the plug has a diameter slightly larger than the internal diameter of the core 522. With the sleeve 512 contained in the jig or fixture (as shown diagrammatically in FIG. 12) an axial force applied to the plug member 515, designated by the force Vector F, will drive the plug into the core 522. Preferable the plug is hardened, or at least case hardened, and the hollow core 522 is relatively soft. This force driving the plug into the core will cause the relatively soft material of the core to expand and flow to some degree around the helically preformed elements 20 to form a secure bond.

This plug member 515 preferable is left in the core 522, as shown in FIG. 13, to prevent the core from collapsing or giving under stress and provide a firm solid base to solidly maintain the helically preformed members bonded between the core and the sleeve.

Although swaging and expansion type mechanical forces have been described in conjunction with forming this type of socket gripping device, it is to be understood that various other types of mechanical force can be applied to cause material movement to bond helically formed elements to a socket. Any type of mechanical force and socket and core configuration which will provide for such material movement or flow can be used in practicing this invention.

In the various methods described in forming the socketed dead end according to this invention, the helically preformed elements have been wrapped around the core and inserted into the hollow socket member. It has been found that if too much clearance is allowed between the internal surface of the sleeve and the external surfaces of the helically preformed elements, two rather serious disadvantages are encountered. First, it is difficult to maintain the elements wrapped on the core in the proper position during the swaging operation; and second, an excessive amount of force is needed just to close the diameter of the socket down far enough until it starts to engage the external surfaces of the helically formed elements before any bonding action takes place. On the other hand, reducing this clearance makes it difficult to insert the core with the helically formed elements wrapped thereon into the hollow sleeve. It has been found, therefore, that it is preferable in practicing the invention to select the interior diameter of the sleeve to be equal to, or just slightly smaller than the outside diameter of the helically formed elements wrapped up on the core and then heat the sleeve member so that it expands to a diameter larger than the external diameter of the helically formed elements wrapped around the core. The sleeve in the heated condition can then easily be slipped over the helically formed elements. This will tightly hold the elements in place for the swaging or other mechanical working operation which will ultimately cause the bond. In the case of the method described with reference to FIGS. 10 and 11, both the ring and the sleeve may be heated with good results.

Referring now to FIGS. 15 and 16, still another embodiment of the gripping device according to this invention is shown. In this embodiment the helically preformed rods are secured between the sleeve member and the core member by a wedging action produced by the relationship of these members as opposed to a flow of metal as in the previously described embodiments.

In this embodiment the sleeve member 612 takes the form of a socket having a generally frusto-conically shaped interior cavity 613. The plug or core 615 has a generally frusto-conically end portion 616 and a tongue or projecting portion 617.

In order to form the dead end, the helically formed rods 20 are wrapped around the plug 615 and their ends inserted through the end opening 619 in the socket as shown in FIG. 15. The plug 615 with the rods 20 wrapped thereon is then wedged firmly into the interior cavity 613 of the socket 612. The complimentary taper between the cavity 613 and the end portion 616 of the plug 615 will cause a wedging action to take place, wedging the rods 20 between the socket 612 and the core 615. The tighter the line pulls against the rods 20, the tighter will be the wedging action developed within the sleeve 612. This wedging action will firmly seat the rods 20 between the core 615 and the sleeve 612 providing a firm gripping action which will effectively grip the line being dead ended.

In illustrating the various embodiments of the invention, the elements have been helically preformed throughout their entire length. The helical formation is for the purpose of allowing the elements to grippingly engage a line and hence those portions of the elements which extend from the socket must be so formed so that they can grippingly engage a line. It is also desirable that the ends of the elements which are contained within the sleeve also be helically preformed, but it is not essential. The helical formation has a certain amount of resistance toward any tendency of the elements to pull loose from the socket and thus this type of helical formation throughout the entire length of the elements is desired, but it is not absolutely necessary.

Also, as is well known in the art, some type of grip enhancing material may be used on the rods 20. This may take the form of alumina, or other grit adhesively applied to the rods.

While several embodiments of this invention have been shown and described, various adaptations and modifications may be made thereof without departing from the scope of the invention as defined in the appended claims.

What is claimed is:

1. A method of forming a gripping device comprising the steps of providing a core member, providing a sleeve member having a central opening larger than the core member, at least one of said members including material deformable by mechanical action, and providing a plurality of resilient elements having first and second end portions, at least the first end portion being helically formed and substantially conforming to each other with respect to pitch length and hand of lay, assembling said sleeve member and said core member in telescoping relationship with the second end portions of said elements disposed within said sleeve member around said core member, said second end portions being arranged in spaced relationship with respect to each other and free of mechanical interconnection, and applying mechanical force to the assembly to cause deformation of said deformable material to bond said elements individually between said core member and said sleeve member.

2. The method of claim 1 wherein said mechanical working includes a swaging operation.

3. A method of claims 1 wherein a heat differential is applied to the sleeve with respect to the helically formed elements prior to assembly whereby to enlarge the clearance.

4. The method of claim 2 wherein said heat differential is applied by heating said sleeve member.

5. The method of claim 1 wherein said core member includes a hollow portion and wherein said mechanical work is applied to expand said core portion.

6. The method of claim 5 wherein a plug is driven into said hollow core portion and remains therein to provide said expansion.

7. The method of claim 1 wherein said second end portions of said elements are helically formed and are layed up on said core member in spaced helical relationship.

* * * * *